Patented Nov. 23, 1943

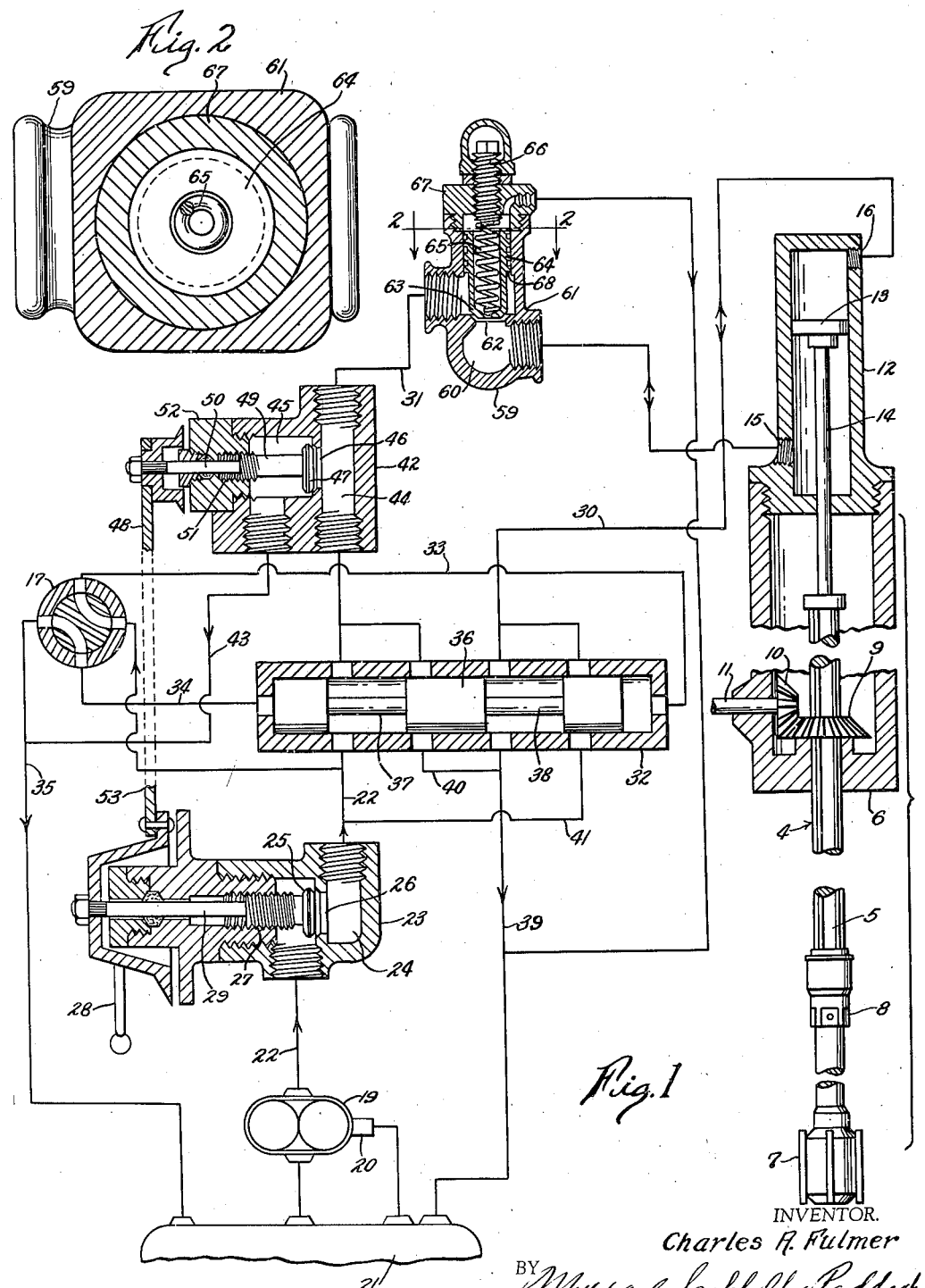

2,334,758

UNITED STATES PATENT OFFICE 2,334,758

HONING MACHINE

Charles A. Fulmer, Waukegan, Ill.

Application January 30, 1942, Serial No. 428,910

3 Claims. (Cl. 51—34)

This invention relates to honing machines and is directed to an improved hydraulic system for controlling the tool actuating parts of machines of this general nature.

It is an object of the invention to provide an improved hydraulic system for reciprocating the tool carrying part of a vertical honing machine which has a greatly simplified and effective counterbalancing means therein cooperating with a tool speed equalizing valve to effect a "dwell" period for the tool at its lowermost limit of motion.

Another object of the invention is to provide an hydraulic control for a honing machine provided with a cylinder which will move the tool carriage therefor at the same speed for either phase of its reciprocation, said hydraulic control automatically adjusting the rate of flow differential between that in the small displacement end and that of the larger displacement side of the cylinder for all reciprocating carriage speeds.

Other objects will be apparent from the following specification and drawing illustrating the preferred embodiment of my invention, and in which:

Fig. 1 is a diagrammatic view of the hydraulic system for honing machines, the valves and some machine parts being shown in cross-section and other machine parts being indicated in fragmental, side elevation.

Fig. 2 is an enlarged cross-section taken on line 2—2 of Fig. 1.

4 indicates a reciprocating, tool-carrying part comprising a splined spindle 5 vertically movable in a housing 6 of a honing machine and carrying at its lower end a honing tool 7 which is connected to the spindle by means of a universal joint 8. The spindle is constantly rotated while the machine is in operation by a gear 9 rotatably mounted on the housing 6, the spindle having vertical reciprocation relative to said gear. The gear 9 is turned by a gear 10 mounted on the end of a motor driven shaft 11. Upon the housing 6 is positioned an hydraulic cylinder or motor 12 which has a piston 13 movable therein and connected to the upper portion of the spindle by a shaft 14. The honing tool is reciprocated within a cylinder to be honed (not shown) and also moved upwardly to an inoperative point beyond the honed cylinder by alternately introducing fluid under pressure from the main line 22 into the duct 15 on the small side of the cylinder 12 and into duct 16 on the larger side of said cylinder. The alternate introduction of pressure fluid through the ducts 15 and 16 is controlled by a pilot valve 17 actuated by stops (not shown) movable with the carriage member of the machine while the inoperative upper limit of motion of the honing tool is manually controlled by closing a volume control valve 23 when said tool moves upwardly to its inoperative position.

The hydraulic system and the valve means for controlling a honing machine of the general type described, consists of a motor driven pump 19 which creates the constant fluid pressure for the system. The pump has a conventional spring-load relief valve 20 thereon which returns excess fluid to the sump tank 21 when the pressure in the main line 22 exceeds a definite maximum pressure or returns all the pressure fluid to the tank when the control valve 23 is closed. Interposed in the main line 22 is the manually operated volume control valve 23 for maintaining any desired volume in the system between the maximum pump capacity and zero and which also is used to stop or start the machine operated by my system. This valve has a passageway 24 connected to the main line through which pressure fluid passes. The passageway may be opened and closed or its effective diameter varied by means of a valve 25 which cooperates with a valve seat 26. The valve has a threaded shaft 27 connected thereto which is rotated manually by a lever 28 fastened to it through a connecting shaft 29.

The piston 13 is reciprocated within the cylinder 12 by alternately introducing fluid under pressure into the branch pressure line 30 communicating with the upper duct 16 in the cylinder and the branch pressure line 31 connected to the lower duct 15, the latter duct being on the small side of the cylinder through which the piston rod passes. The branch lines are alternately and simultaneously pressure and drain lines for the pressure-transmitting medium, it being understood that when branch line 31 is introducing fluid under pressure to the lower end of the cylinder, branch line 30 will be draining fluid to the sump tank from the upper end of the cylinder and vice versa. The means for alternately introducing pressure fluid in the main line 22 to either side of the cylinder to reciprocate the tool-carrying part of the machine in its operative motions upon work to be honed, consists of a reverse control valve 32 operated by the pilot valve 17. By turning the pilot valve 17, either manually by a suitable lever (not shown), or automatically in a conventional manner by actuation through stops on the tool carriage, the direction control valve may be reversed, thus reversing the direction of movement of the piston 13. As shown in Fig. 1, the pilot valve is in position to admit fluid under pressure from the main line 22 to the righthand side of cylinder 32 through line 33. When the pilot valve is moved 90°, pressure fluid from the main line 22 will be admitted to the lefthand side of the cylinder 32 through line 34, thus moving the piston to the right. It will be noted that when line 33 is carrying pressure fluid to the direction control valve 32, line 34 is draining fluid to the sump tank 21 by line 35 and vice versa. The piston 36 of the direction control valve has two reduced portions 37 and 38 formed therein which act as passageways for the ports with which they are aligned. As illustrated in the drawing, portion 37 has opened the main pressure line 22 to branch line 31 to introduce pressure fluid to the lower side of the cylinder 12, while reduced portion 38 has opened a drain line 39 to the branch line 30 thereby exhausting fluid from the upper part of cylinder 12. It will therefore be seen that the piston is carrying the tool carriage in an upward movement of its reciprocating motion.

When the piston 36 has been moved to the right side of the cylinder 32 by operation of the pilot valve from a position shown in Fig. 1, through 90° from the illustrated position by actuation of said pilot valve by the tool carriage or by a manual lever, portion 37 opens branch line 31 to auxiliary line 40 of the drain line 39 while portion 38 opens branch line 30 to auxiliary line 41 communicating with the main pressure line 22, thus changing branch line 30 from a drain to a pressure line and branch line 31 from a pressure line to a drain line.

The means for equalizing the speed of the piston 13 in either its upward or downward direction of motion, consists of a proportioning valve 42 which is adjusted to constantly bleed a certain volume of fluid from branch line 31 into drain line 35 through line 43 when pressure fluid is being introduced by line 31 into the lower or small end of cylinder 12, which is the end through which the piston rod 14 passes. The proportioning valve 42 has a passageway 44 through which pressure fluid or exhaust fluid in line 31 freely passes. A chamber 45 is formed at right angles to the passageway 44 and it communicates with said passageway by an opening 46. The opening 46 forms a seat for an adjustable valve 47. The adjustment of this valve relative to the seat determines the exact amount of fluid bled from branch line 31 when it is introducing pressure fluid to the small side of the piston. The valve is adjusted by means of a lever 48 fastened to a threaded portion 49 by shaft 50. The threaded portion 49 engages internal threads 51 formed in the valve cap 52. The lever 48 is connected to lever 28 of the control valve by a link 53 so that upon manual adjustment of the volume control valve, the proportioning valve will automatically be adjusted to bleed off the proper proportion of pressure fluid in branch line 31 when the volume of pressure fluid in the system is increased or decreased. In other words, the proportioning valve is connected to the volume control valve so that under varying speeds of the piston 13, made by adjusting the volume control valve 23, the proportioning valve will bleed off enough volume of fluid to equalize the piston motion in both phases of reciprocation under all speeds of piston travel.

The means for stopping the piston 13 in its upper inoperative position within the cylinder which determines the inoperative position of the honing tool outside the work, consists of manually closing the volume control valve 23 when the piston is in its upper inoperative position, thus returning all the pressure fluid from the pump 19 to the sump through relief valve 20 until said motor is made inoperative or the control valve 23 is again opened.

The means for holding the reciprocated, tool-carrying part of the machine and all its associated parts in equilibrium regardless of the position at which said parts come to rest, consists of the counterbalance valve 59 which has an S-shaped passage 60 formed in the casing 61, the intermediate wall of said passage being formed to provide a valve seat 62. The small end or head 63 of a piston 64 moving vertically within the casing 61 functions as a valve which may engage or disengage the valve seat 62 to respectively close or open said valve. The branch pressure line 31 is connected to either side of the passage 60 so that said passage forms part of the said line. The valve is urged against its seat by means of a spring 65, its load on said valve being adjusted by a screw 66 engaged by the upper end of said spring and threaded in a cap 67 fastened to the upper end of the casing 61. The piston has an upper enlarged portion and a smaller portion 63 thereby forming an annulus 68 between them. When the branch line 31 is carrying pressure fluid, as shown in Fig. 1, said fluid impinges on the annulus 68 and moves the piston upwardly against the load of the spring 65, thereby opening the valve 59. Pressure fluid is therefore introduced into the small end of the cylinder 12 to move the piston 13 upwardly. If for any reason, whether because of failure of the branch lines, the breakdown of the system, or the stopping of the machine, the piston and its associated reciprocating parts are stopped at an intermediate position within the cylinder, they are prevented from moving downwardly under the force of gravity by the valve 59 which closes branch line 31 against exhaustion of fluid from the cylinder by the load of the spring 65 on the valve 63. The piston will only move downwardly against the closed spring action of the valve 59 when pressure fluid is introduced into the top duct 16 of the cylinder. The pressure exerted by the spring 65 must be great enough to retain fluid in the lower side of the cylinder when branch line 31 acts as a drain line, thus sustaining the reciprocating mass in equilibrium. To permit downward movement of the piston 13, the introduction of pressure fluid through line 30 to the top of the cylinder creates a downward force which, with the weight of the tool carriage and associated parts, provides sufficient pressure on the small end 63 of the counterbalance valve to move the piston 64 upwardly against the load of the spring 65 to thereby open said valve and permit exhaustion of fluid from the bottom of the cylinder.

It will be noted that the proportioning valve 42 and the counterbalance valve 59 cooperate to effect a "dwell" of the honing tool at the lowermost limit of motion of the reciprocated part during its working cycle, to prevent barrel shaping of cylinders which have a closed or "blind" end such as in cylinders for airplane motors or the like. When the honing tool is reversed from a downward to an upward direction, pressure fluid is directed to the rod end of cylinder through line 31. This pressure fluid is prevented momentarily from entering said rod end by the resistance of the spring 65 on the annulus portion 68 of the counterbalance valve. Static pressure fluid is therefore momentarily built up in said line and the proportioning valve 42 functions to bleed off a part thereof thereby reducing said static pressure and further delaying the action of the fluid to open the counterbalance valve. This delayed action is in proportion to the speed of the tool carriage which is controlled by the control valve attachment on the proportioning valve.

What is claimed is:

1. In a honing machine the combination of a reciprocated, tool-carrying part, a cylinder, a piston movable within the cylinder, a piston rod extending into one end of the cylinder and connecting the piston to the part, a main fluid pressure line, a volume control valve in the main line, rotatable means on the valve for varying the volume of fluid in the main line, a duct in each end of the cylinder, a branch pressure line connected to each duct, means for alternately introducing fluid from the main line into the branch lines, a proportioning valve in the branch line communicating with the duct on the end of the cylinder through which the piston rod passes, a drain line connected to the proportioning valve, rotatable means on said valve for directing a predetermined volume of the fluid introduced therein to the drain line, and means connecting the rotatable means on the proportioning valve and on the volume control valve whereby the proportioning valve will bleed off a volume of fluid from the branch line bearing a direct relationship to the variation in volume admitted to the main pressure line by the control valve.

2. In a honing machine the combination of a reciprocated, tool-carrying part, a cylinder, a piston movable within the cylinder, a piston rod extending into one end of the cylinder and connecting the piston to the part, a main fluid pressure line, a volume control valve in the main line, rotatable means on the valve for varying the volume of fluid in the main line, a duct in each end of the cylinder, a branch pressure line connected to each duct, means for alternately introducing fluid from the main line into the branch lines, a proportioning valve in the branch line communicating with the duct on the end of the cylinder through which the piston rod passes, a drain line connected to the proportioning valve, rotatable means on said valve for directing a predetermined volume of the fluid introduced therein to the drain line, and a link pivoted to the rotatable means on the proportioning valve and to the volume control valve whereby the proportioning valve will bleed off a volume of fluid from the branch line bearing a direct relationship to the variation in volume admitted to the main pressure line by the control valve.

3. In a honing machine the combination of a vertically reciprocating tool-carrying part, a vertical cylinder positioned above the part, a piston rod connecting the piston to the part, a duct in each end of the cylinder, a pipe connected to each duct, hydraulic means for alternately and simultaneously constituting each pipe a pressure line and a drain line for their respective cylinder ends, a proportioning valve interposed in the pipe to the duct on the lower end of the cylinder, a drain line for the proportioning valve, a constantly opened orifice in said valve for directing a predetermined volume of the pressure fluid introduced therethrough to the drain line, a counterbalance valve interposed in the pipe to the lower end of the cylinder between the proportioning valve and the lower duct, and a plunger in the counterbalance valve for precluding the passage of pressure fluid therethrough below a predetermined pressure, whereby the opening of the plunger is momentarily delayed by the bleeding off of pressure fluid by the proportioning valve.

CHARLES A. FULMER.